United States Patent
Ramachandran

(10) Patent No.: US 7,620,003 B2
(45) Date of Patent: Nov. 17, 2009

(54) SYSTEM AND METHOD OF OPERATION OF A COMMUNICATION NETWORK

(75) Inventor: Shyamal Ramachandran, Heathrow, FL (US)

(73) Assignee: Motorola, Inc., Schaumburg, IL (US)

(*) Notice: Subject to any disclaimer, the term of this patent is extended or adjusted under 35 U.S.C. 154(b) by 582 days.

(21) Appl. No.: 11/427,188

(22) Filed: Jun. 28, 2006

(65) Prior Publication Data

US 2008/0002631 A1 Jan. 3, 2008

(51) Int. Cl.
- H04B 7/14 (2006.01)
- H04W 4/00 (2009.01)
- H04L 12/28 (2006.01)
- H04B 3/36 (2006.01)
- H04W 40/00 (2009.01)

(52) U.S. Cl. .................. 370/315; 370/338; 370/400; 370/395.3; 455/7; 455/445

(58) Field of Classification Search .............. 455/7–10, 455/15–16, 41.2, 59, 422.1, 445–446, 466, 455/524–525, 550.1, 556.2, 560–561, 11.1, 455/13.1, 418–421, 428, 448–449, 453, 552.1; 370/237–238, 285, 293, 338, 351, 392–393, 370/400–402, 406, 420, 911, 913, 221–222, 370/315–316, 327–328, 331–332, 395.3–395.32; 709/238–242, 244

See application file for complete search history.

(56) References Cited

U.S. PATENT DOCUMENTS

| | | | |
|---|---|---|---|
| 6,353,742 B1 * | 3/2002 | Bach | 455/453 |
| 7,002,933 B1 | 2/2006 | Poon et al. | |
| 7,003,311 B2 | 2/2006 | Ebata et al. | |
| 7,236,470 B1 * | 6/2007 | Bims | 370/328 |
| 7,248,560 B1 * | 7/2007 | Blankenship et al. | 370/220 |
| 2002/0173310 A1 * | 11/2002 | Ebata et al. | 455/445 |
| 2003/0068975 A1 | 4/2003 | Qiao et al. | |
| 2004/0090924 A1 | 5/2004 | Giaimo et al. | |
| 2004/0146007 A1 * | 7/2004 | Saadawi et al. | 370/328 |
| 2004/0147223 A1 * | 7/2004 | Cho | 455/41.2 |
| 2004/0233881 A1 * | 11/2004 | Kang et al. | 370/338 |
| 2005/0254448 A1 * | 11/2005 | Tang et al. | 370/328 |
| 2005/0271060 A1 * | 12/2005 | Kodialam et al. | 370/394 |
| 2006/0126535 A1 * | 6/2006 | Sherman | 370/254 |
| 2006/0285529 A1 * | 12/2006 | Hares et al. | 370/338 |
| 2007/0030809 A1 * | 2/2007 | Dayama | 370/237 |

(Continued)

OTHER PUBLICATIONS

International Search Report and Written Opinion—PCT/US07/64985 mailed Oct. 14, 2008—10 pages.

*Primary Examiner*—Meless N Zewdu
(74) *Attorney, Agent, or Firm*—Randi L. Karpinia

(57) ABSTRACT

A communication network includes a base station, a relay station, and a subscriber station. The base station is communicatively coupled to a backhaul for routing one or more messages through the backhaul to a destination. The relay station is communicatively coupled to the base station and further communicatively coupled to an alternate backhaul. The relay station includes a relay station mode of operation for relaying messages between the base station and the subscriber station, and a base station mode of operation for other messages from the subscriber station through the alternate backhaul to the destination. The subscriber station is communicatively coupled to the base station and further communicatively coupled to relay station.

25 Claims, 12 Drawing Sheets

U.S. PATENT DOCUMENTS

2007/0147255 A1* 6/2007 Oyman ....................... 370/238
2007/0201427 A1* 8/2007 Lee et al. .................... 370/351
2008/0137580 A1* 6/2008 Axelsson et al. ............ 370/315

* cited by examiner

SYSTEM AND METHOD OF OPERATION OF A COMMUNICATION NETWORK

FIELD OF THE INVENTION

The present invention relates generally to wireless communication systems and more particularly to the operation of a communication network utilizing relay stations and multiple backhauls.

BACKGROUND

An infrastructure-based wireless network typically includes a communication network with fixed and wired gateways. Many infrastructure-based wireless networks employ a mobile unit or host which communicates with a fixed base station that is coupled to a wired network. The mobile unit can move geographically while it is communicating over a wireless link to the base station. When the mobile unit moves out of range of one base station, it may connect or "handover" to a new base station and starts communicating with the wired network through the new base station.

In comparison to infrastructure-based wireless networks, such as cellular networks or satellite networks, ad hoc networks are self-forming networks which can operate in the absence of any fixed infrastructure, and in some cases the ad hoc network is formed entirely of mobile nodes. An ad hoc network typically includes a number of geographically-distributed, potentially mobile units, sometimes referred to as "nodes," which are wirelessly connected to each other by one or more links (e.g., radio frequency communication channels). The nodes can communicate with each other over a wireless media without the support of an infrastructure-based or wired network. Links or connections between these nodes can change dynamically in an arbitrary manner as existing nodes move within the ad hoc network, as new nodes join or enter the ad hoc network, or as existing nodes leave or exit the ad hoc network. Because the topology of an ad hoc network can change significantly techniques are needed which can allow the ad hoc network to dynamically adjust to these changes. Due to the lack of a central controller, many network-controlling functions can be distributed among the nodes such that the nodes can self-organize and reconfigure in response to topology changes.

One characteristic of the nodes is that each node can directly communicate over a short range with nodes which are a single "hop" away. Such nodes are sometimes referred to as "neighbor nodes." When a node transmits packets to a destination node and the nodes are separated by more than one hop (e.g., the distance between two nodes exceeds the radio transmission range of the nodes, or a physical barrier is present between the nodes), the packets can be relayed via intermediate nodes ("multi-hopping") until the packets reach the destination node. In such situations, each intermediate node routes the packets (e.g., data and control information) to the next node along the route, until the packets reach their final destination. For relaying packets to the next node, each node should maintain routing information collected through conversation with neighboring nodes. The routing information can also be periodically broadcast in the network to reflect the current network topology. Alternatively, to reduce the amount of information transmitted for maintaining accurate routing information, the network nodes may exchange routing information only when it is needed. In an approach known as Mesh Scalable Routing (MSR), nodes periodically send HELLO messages (e.g., once per second) that contain routing information and metrics associated with each route. Mobile nodes use information extracted from the HELLO messages to decide the most efficient manner for performing handoff.

IEEE 802.16 is a point-to-multipoint (PMP) system with one hop links between a base station (BS) and a subscriber station (SS). Such network topologies severely stress link budgets at the cell boundaries and often render the subscribers at the cell boundaries incapable of communicating using the higher-order modulations that their radios can support. Pockets of poor-coverage areas are created where high data-rate communication is impossible. This in turn brings down the overall system capacity. While such coverage voids can be avoided by deploying BSs tightly, this drastically increases both the capital expenditure (CAPEX) and operational expenditure (OPEX) for the network deployment. A cheaper solution is to deploy relays stations (RSs) or repeaters in the areas with poor coverage and repeat transmissions so that subscribers in the cell boundary can connect using high data rate links.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
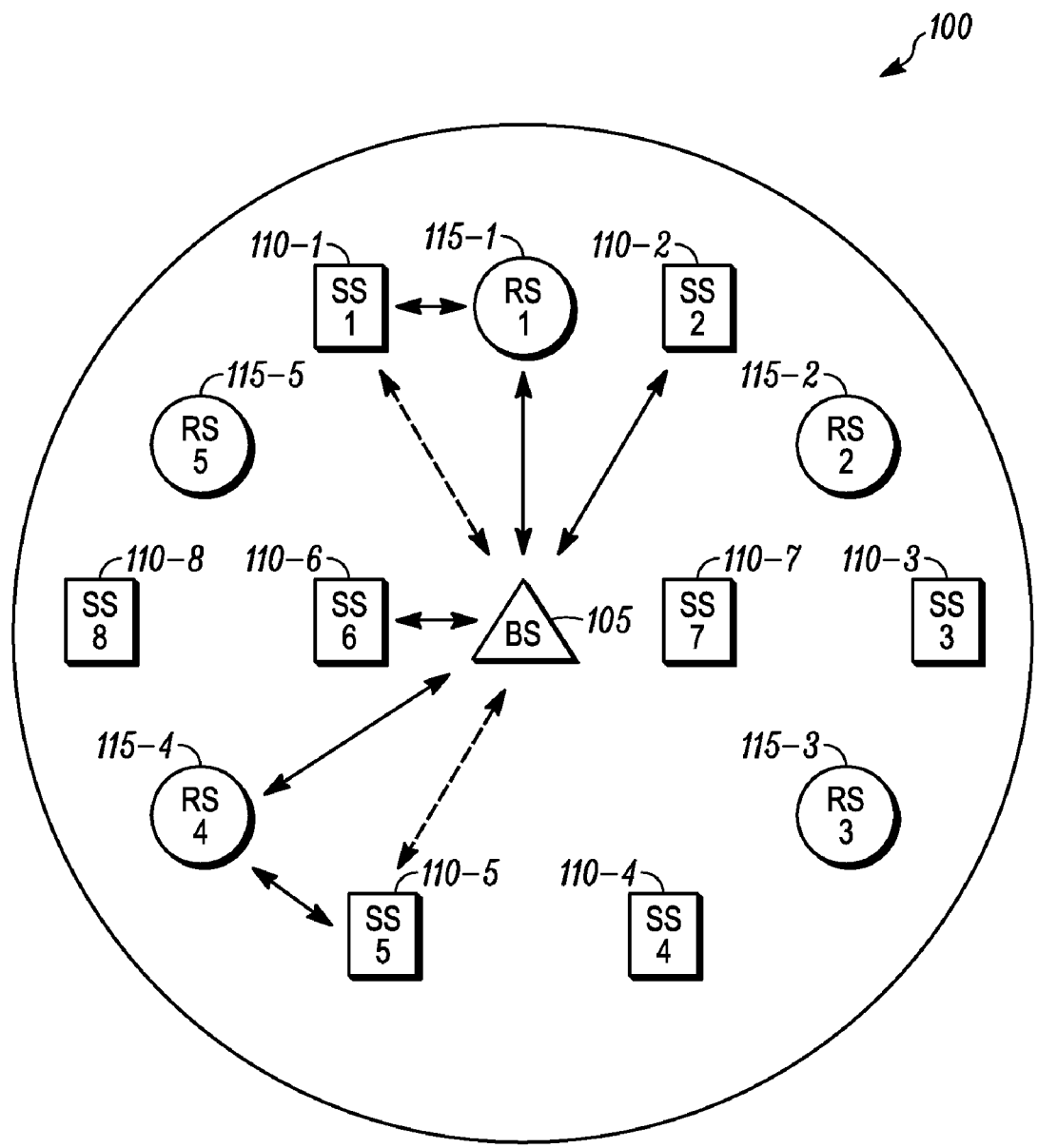
FIG. 1 illustrates an exemplary wireless communication network in accordance with some embodiments of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to switching relay station modes in a multihop backhaul network. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of switching relay station modes in a multihop backhaul network described herein. The non-processor circuits may include, but are not limited to, a radio receiver, a radio transmitter, signal drivers, clock circuits, power source circuits, and user input devices. As such, these functions may be interpreted as steps of a method to perform the switching of relay station modes in a multihop backhaul network. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The present invention provides a system and method for using relay stations (RSs) in backhaul applications, where relay station entities can switch between relay station and base station (BS) modes. A relay station entity is a network device that includes the IEEE 802.16 relay station function. It appears like a base station to the subscribers in its cell. In the relay station mode, it relays all traffic to the base station. In the base station mode, it has the option of routing the traffic to the local alternate backhaul port so that it may egress from the network at the relay station site itself.

FIG. 1 illustrates an exemplary wireless communication network for use in the implementation of an embodiment of the present invention. FIG. 1 specifically illustrates an 802.16 network 100. As illustrated, the network 100 includes at least one base station 105 for communication with a plurality of subscriber stations 110-$n$. The exemplary network 100 further includes a plurality of relays (repeaters) 115-$n$. The relays 115-$n$ are deployed in the areas with poor coverage and repeat transmissions so that subscriber stations 110-$n$ in a cell boundary can connect using high data rate links. In some networks, the relays 115-$n$ are simpler versions of the base station 105, in that they do not manage connections, but only assist in relaying data. Alternatively, the relays 115-$n$ can be at least as complex as the base station 105.

It will be appreciated by those of ordinary skill in the art that the introduction of relays 115-$n$ in an IEEE 802.16 network, with the intention of resolving coverage problems, will have to consider the following constraints: a) connections are created and managed by the base station 105; b) the base station 105 alone manages the relays 115-$n$, and the subscriber stations 110-$n$ are unaware of the presence of relays 115-$n$ (relaying is transparent to the subscriber stations 110-$n$).

Therefore, in a network 100 with relays 115-$n$, the base station 105 typically decides whether a subscriber station 110-$n$ should connect to the base station 105 directly or through a relay 115-$n$. There could be multiple relays 115-$n$ in the cell targeting multiple pockets of poor coverage. The base station 105 also typically decides which one of the relays 115-$n$ is the best candidate to relay the subscriber station's connection. The subscriber station 110-$n$ performs ranging with the base station 105 alone, since it is unaware of the presence of the relays 115-$n$. The base station 105 must be able to seamlessly assist the subscriber station 110-$n$ with the ranging with respect to the preferred relay 115-$n$.

In typical systems such as the network 100, IEEE 802.16 base stations (BSs) do not forward traffic to other base stations on the air interface. Further, IEEE 802.16 Relays (RSs) can forward traffic to base stations, relay stations, or subscriber stations (SSs). As previously mentioned, the relay stations are themselves managed/controlled by at least one of the base stations. Further Relay stations can also be nomadic/mobile. No BS-to-BS communication over an IEEE 802.16 air interface is possible today.

Figure 1A:
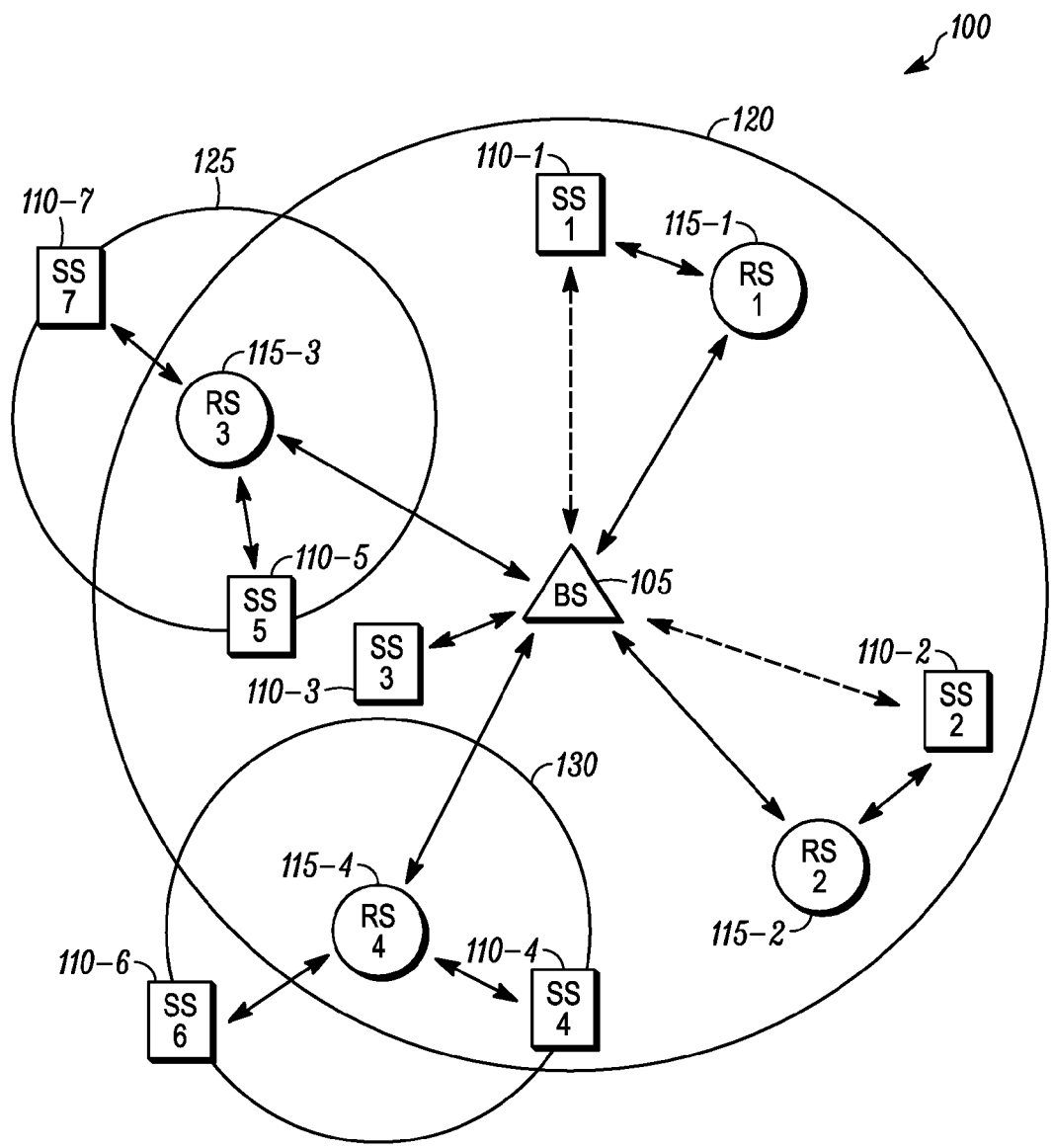
FIG. 1A illustrates an alternate configuration of the exemplary wireless communication network of FIG. 1 in accordance with some embodiments of the present invention.

FIG. 1A illustrates an alternate configuration of the exemplary wireless communication network 100 of FIG. 1 in accordance with some embodiments of the present invention. As illustrated in FIG. 1A, the relay stations of the network 100 can provide communication coverage outside the base station coverage area. For example, a relay station 3 115-3 provides a coverage area 125 and a relay station 4 115-4 provides a coverage area 130 which include communication coverage outside of a coverage area 120 of the base station 105. Thus communication by relay station 3 115-3 can include communication for subscriber station 7 110-7; and communication by relay station 4 115-4 can include communication for subscriber station 6 110-6, which otherwise would not be possible directly to the base station 105. Since subscriber station 6 110-6 and subscriber station 7 110-7 cannot be controlled by the base station 105 directly, they are entirely controlled by the relay stations 115-4 and 115-3 respectively.

Figure 2:
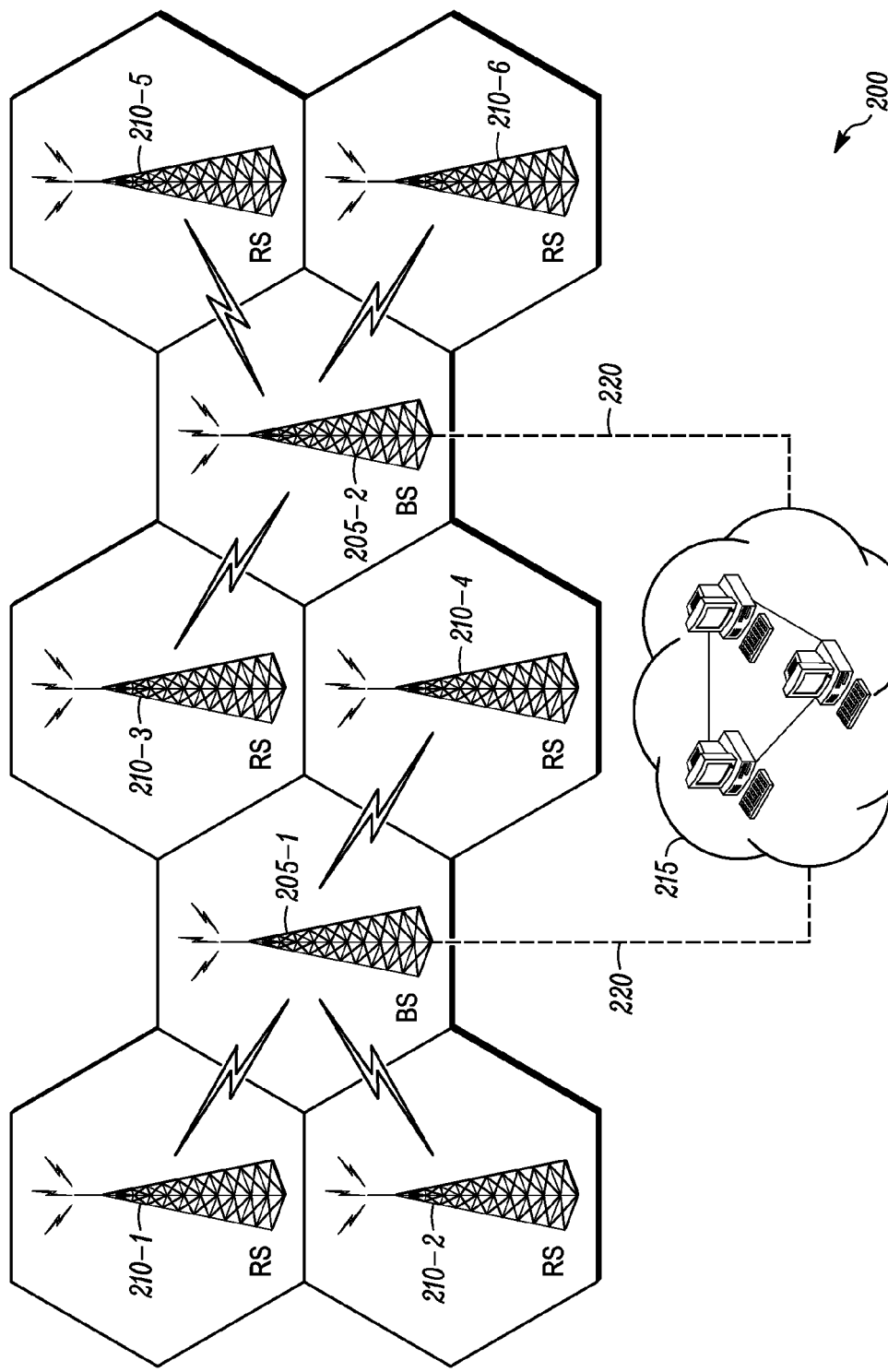
FIGS. 2 and 3 illustrate various network deployments of the wireless communication network of FIG. 1 in accordance with some embodiments of the present invention.

With relay stations available, network operators can roll out networks in developing markets more gradually. FIG. 2 illustrates an exemplary initial deployment of a network 200 where the network operator uses few BSs 205-$n$ and provides them with network point-of-presence (POP) terminations. The operator provides coverage beyond the BSs 205-$n$ footprint by employing RSs 210-$n$. The traffic from the RSs 210-$n$ is routed to the BS 205-$n$ to be sent out over a leased backhaul 220 to a larger network 215 such as the Internet. As the service demand grows the individual sites get loaded with large amounts traffic and can no longer allow spectrum resources to be used to carry traffic to the BS 205-$n$. The operator too finds it more justifiable to lease network POP at the RS 210-$n$ sites and carry traffic out of the network at those sites itself, instead of bringing it to the BS 205-$n$.

Figure 3:
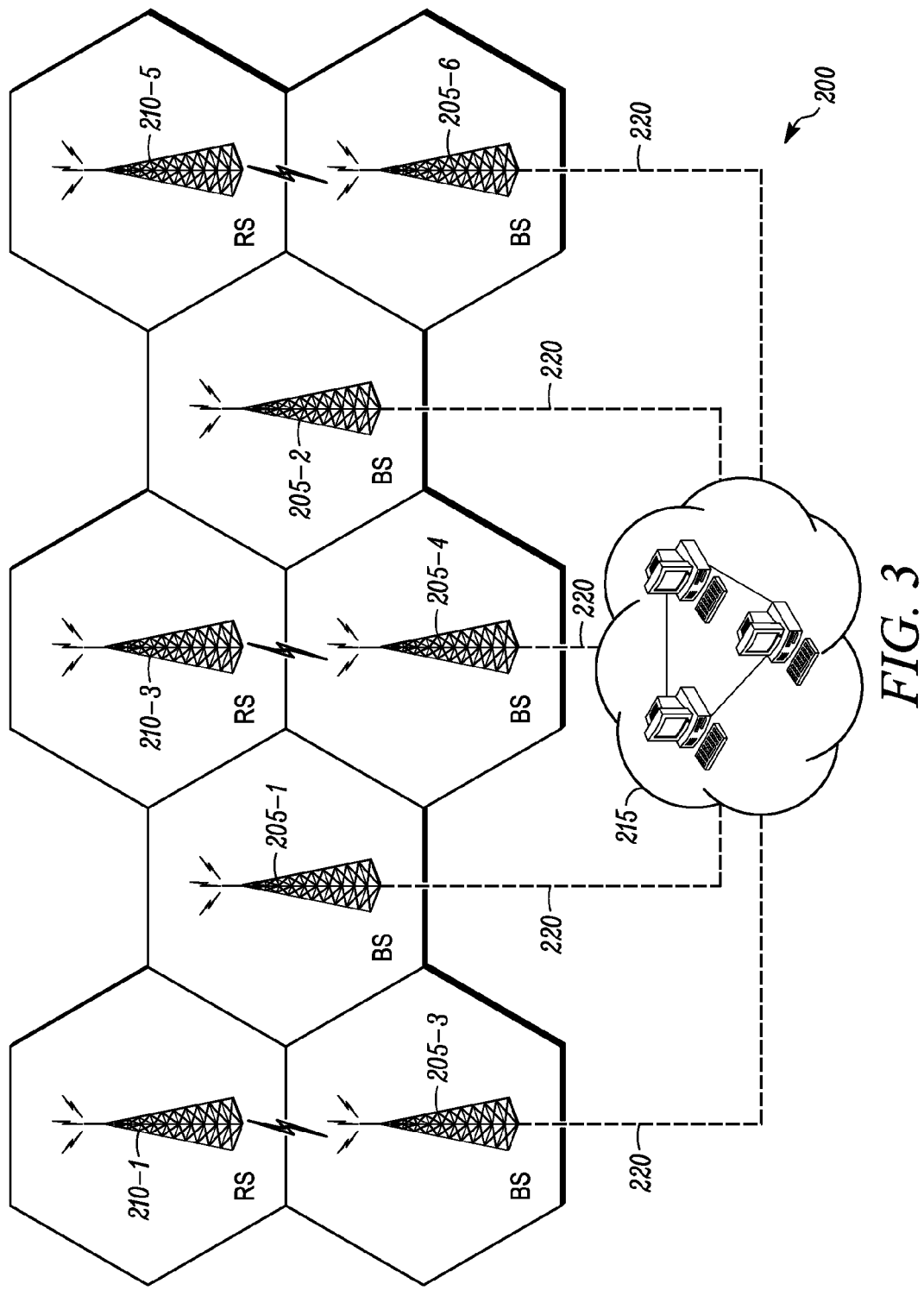

FIG. 3 illustrates the network 200 upgraded to include more base stations with network point-of-presence (POP) terminations. As illustrated in FIG. 3, the relay stations 210-2, 210-4, and 210-6 have been replaced in the network 200 of FIG. 3 with base stations 205-3, 205-4, and 205-6 respectively. The new base stations 205-3, 205-4, and 205-6 are connecting directly to the backhaul 215. Thus by starting with fewer wired POP, and using a multi-hop backhaul, POPs can be added as capacity grows and then switched to a wired backhaul. This approach significantly reduces initial deployment cost and permits seamless upgrade of the network.

Nomadic or mobile RSs can move from one location to another. They can potentially move in to positions where they have alternate backhaul options available (such has wireless Ethernet). Under such circumstances, the operator might want to enable the RS 210-$n$ to egress the site's traffic out of the network through the alternate backhaul.

In both the upgradeable network of FIGS. 2 and 3, and the network including nomadic relay stations, the ability of a RS device to switch between a relay station and a base station mode will prove beneficial.

Figure 4:
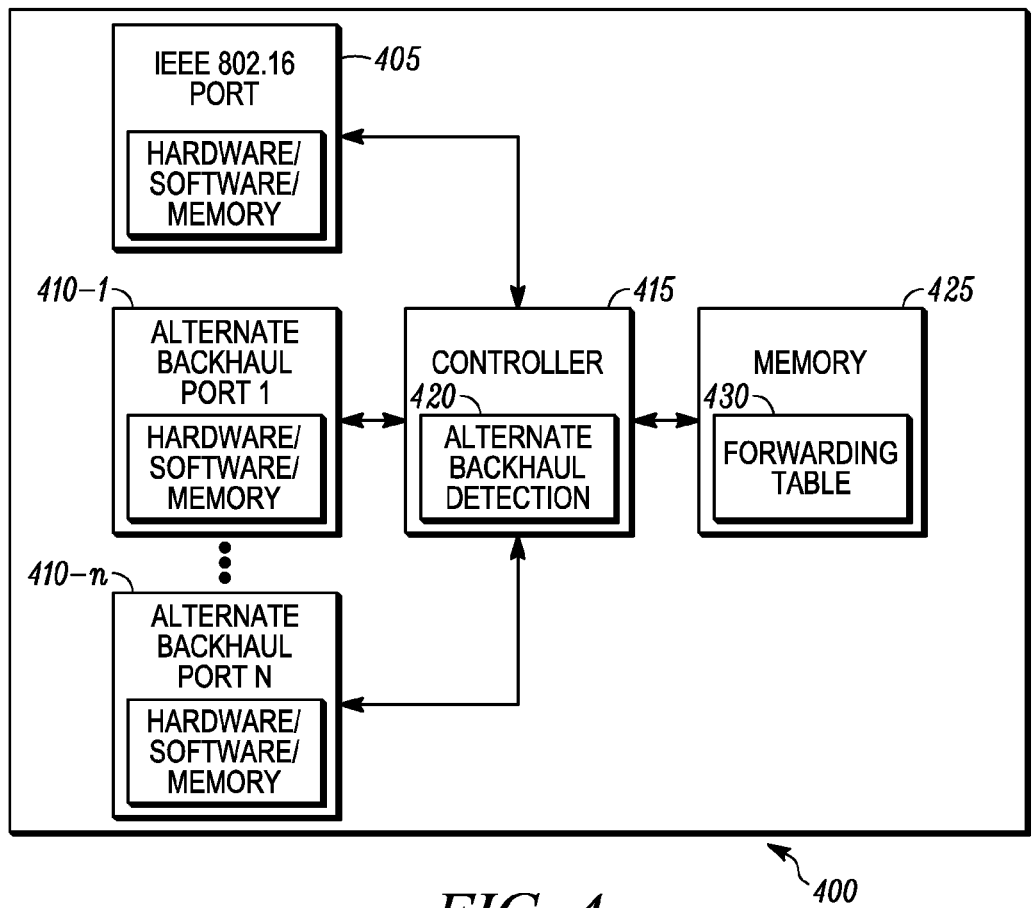
FIG. 4 illustrates an exemplary relay station for use within the networks of FIGS. 1, 2, and 3 in accordance with some embodiments of the present invention.

FIG. 4 illustrates an exemplary relay station 400 for use within the networks of FIGS. 1, 2, and 3 in accordance with some embodiments of the present invention. As illustrated, the relay station 400 comprises a plurality of ports including an IEEE 802.16 port 405, which is used to communicate with one or more base stations and one or more subscriber stations, and at least one alternate backhaul port 410-$n$. The relay station 400 further comprises a controller 415 and a memory 425.

The IEEE 802.16 port 405 provides an endpoint or "channel" for 802.16 network communications by the relay station 400. For example, the relay station 400 can communicate with one or more base stations within an 802.16 network using the IEEE 802.16 port 405. The IEEE 802.16 port 405, for example, can be used to receive both data and management information from one or more base stations and can be used to transmit data and other information to various subscriber stations.

Alternate backhaul ports 410-$n$ similarly provide an endpoint or channel for alternate backhaul communications by the relay station 400. For example, the relay station 400 can communicate over one or more alternate backhauls, which can be wired or wireless, via the alternate backhaul ports 410-$n$. The alternate backhaul ports 410-$n$ may be wired or wireless. The alternate backhaul ports 410-$n$ can, for example, connect to a network switch or a bridge or a network server on the same layer 2 broadcast domain. Alternatively the alternate backhaul port 410-$n$ can, for example, connect to a different layer 3 protocol subnet (such as an Internet Protocol (IP) subnet) through an IP router. In general the alternate backhaul port provides a means for the subscriber stations to reach their intended destination over an alternate backhaul instead of over the air interface to the base station. Those skilled in art will appreciate that in some embodiments the relay station may create a virtual private network (VPN) over the alternate back haul port 410-$n$, to the base station, at least for signaling and control information.

Each of the ports 405 and 410-$n$ are coupled to the controller 415 for operation of the relay station 400. Each of the ports employs conventional demodulation and modulation techniques for receiving and transmitting communication signals respectively, such as packetized signals, to and from the relay station 400 under the control of the controller 415. The packetized data signals can include, for example, voice, data or multimedia information, and packetized control signals, including node update information.

In accordance with the present invention, the controller 415 includes an alternate backhaul detection mechanism 420 for detecting the presence of one or more alternate backhaul network operation among the one or more alternate backhaul ports 410-$n$. It will be appreciated by those of ordinary skill in the art that the alternate backhaul detection mechanism 420 can be hard coded or programmed into the relay station 400 during manufacturing, can be programmed over-the-air upon customer subscription, or can be a downloadable application. It will be appreciated that other programming methods can be utilized for programming the alternate backhaul detection mechanism into the relay station 400. It will be further appreciated by one of ordinary skill in the art that the alternate backhaul detection mechanism can be hardware circuitry within the relay station 400. In accordance with the present invention, the alternate backhaul detection mechanism 420 can be contained within the controller 415 as illustrated, or alternatively can be an individual block operatively coupled to the controller 415 (not shown).

To perform the necessary functions of the relay station 400, the controller 415 and/or the alternate backhaul detection mechanism 420 are each coupled to the memory 425, which preferably includes a random access memory (RAM), a read-only memory (ROM), an electrically erasable programmable read-only memory (EEPROM), and flash memory. The memory 425 includes storage locations for the storage of a forwarding table 430.

It will be appreciated by those of ordinary skill in the art that the memory 425 can be integrated within the relay station 400, or alternatively, can be at least partially contained within an external memory such as a memory storage device. The memory storage device, for example, can be a subscriber identification module (SIM) card. A SIM card is an electronic device typically including a microprocessor unit and a memory suitable for encapsulating within a small flexible plastic card. The SIM card additionally includes some form of interface for communicating with the relay station 400.

Figure 5:
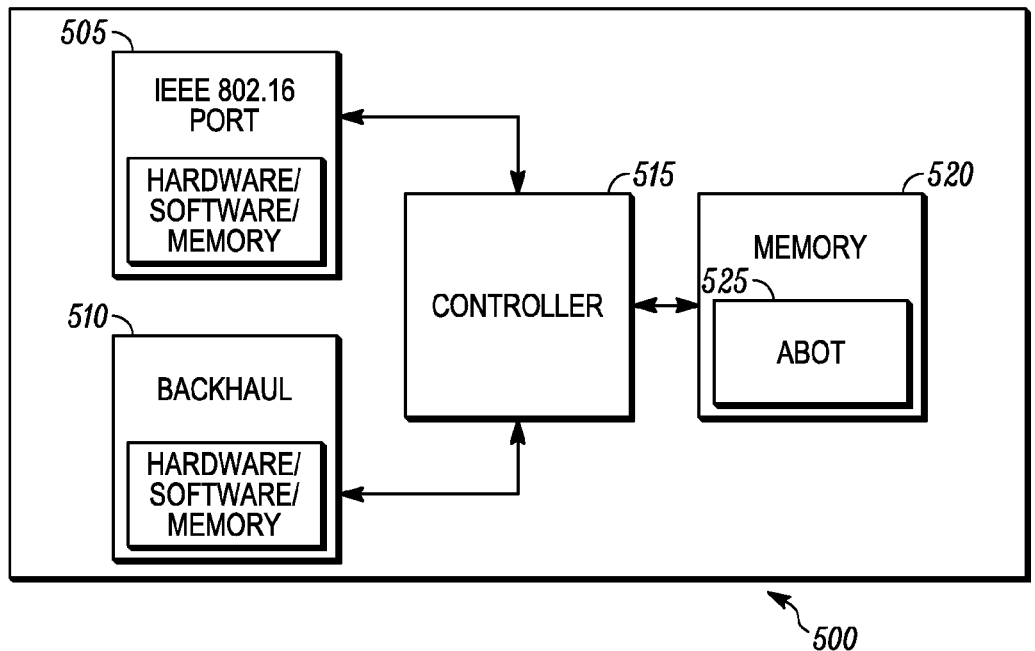
FIG. 5 illustrates an exemplary base station for use within the networks of FIGS. 1, 2, and 3 in accordance with some embodiments of the present invention.

FIG. 5 illustrates an exemplary base station 500 for use within the networks of FIGS. 1, 2, and 3 in accordance with some embodiments of the present invention. As illustrated, the base station 500 comprises an IEEE 802.16 port 505, a backhaul port 510, a controller 515, and a memory 520.

The IEEE 802.16 port 505 provides an endpoint or "channel" for 802.16 network communications by the base station 500. For example, the base station 500 can communicate with one or more relay stations and/or one or more subscriber stations within an 802.16 network using the IEEE 802.16 port 505. The IEEE 802.16 port 505, for example, can be used to transmit both data and management information to one or more relay stations and/or one or more subscriber stations, and to receive data and other information from relay stations and/or subscriber stations.

Backhaul port 510 similarly provides an endpoint or channel for backhaul communications by the base station 500. For example, the base station 500 can communicate with one or more other base stations using the backhaul, which can be wired or wireless, via the backhaul port 510.

Each of the ports 505 and 510 are coupled to the controller 415 for operation of the base station 500. Each of the ports employs conventional demodulation and modulation techniques for receiving and transmitting communication signals respectively, such as packetized signals, to and from the base station 500 under the control of the controller 515. The packetized data signals can include, for example, voice, data or multimedia information, and packetized control signals, including node update information.

To perform the necessary functions of the base station 500, the controller 515 is coupled to the memory 520, which preferably includes a random access memory (RAM), a read-only memory (ROM), an electrically erasable programmable read-only memory (EEPROM), and flash memory. The memory 520 includes storage locations for the storage of an alternate backhaul option table (ABOT) 525.

It will be appreciated by those of ordinary skill in the art that the memory 520 can be integrated within the base station 500, or alternatively, can be at least partially contained within an external memory such as a memory storage device. The memory storage device, for example, can be a subscriber identification module (SIM) card.

Figure 6:
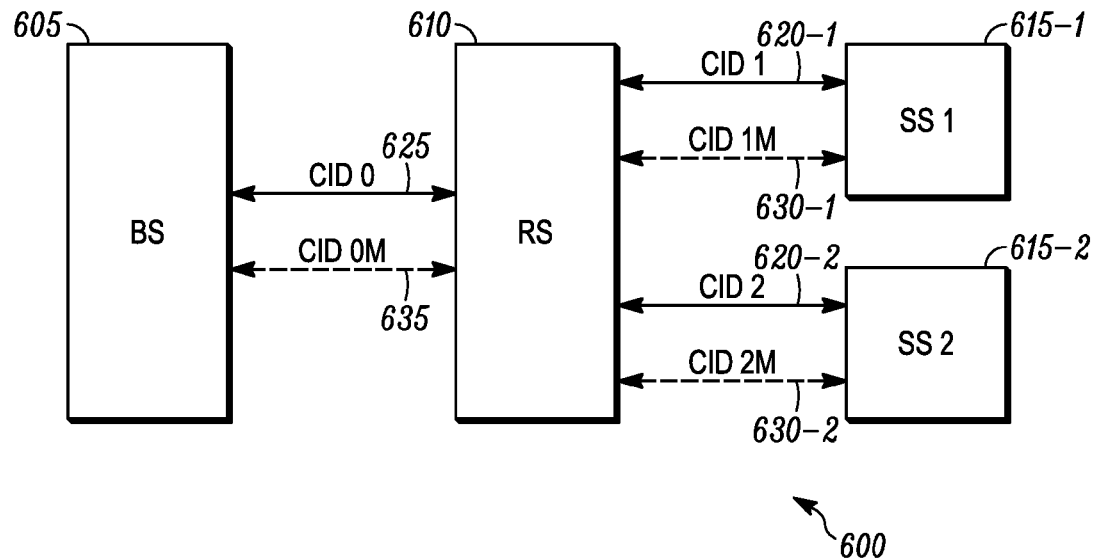
FIGS. 6, 7 and 8 illustrate various exemplary communication schemes for use within the networks of FIGS. 1, 2, and 3 in accordance with some embodiments of the present invention.

FIG. 6 illustrates an exemplary communication scheme 600 for use within an IEEE 802.16 multihop relay communication network. As illustrated in FIG. 6, within the IEEE 802.16 multihop relay communication network, one or more subscriber stations 615-$n$ can access the network through a relay station 610. Each subscriber station 615-$n$ is granted at least one unique connection identification (CID) for its connection with the relay station 610. It will be appreciated by one of ordinary skill in the art that a subscriber station and a relay station can be granted more than one data CID, although one data CID is illustrated herein for exemplary purposes only. For example, subscriber station 1 615-1 is granted a CID1 620-1 and subscriber station 2 615-2 is granted a CID2 620-2. The relay station 610 learns each subscriber station's Media Access Control (MAC) address during the exchange for connection establishment and then associates the subscriber station's MAC address with the assigned CID. In practice, each subscriber station 1 615-$n$ is further granted a management CID 630-$n$ and a data CID 620-$n$. For example subscriber station 1 615-1 is granted a management CID1M 630-1 and subscriber station 2 615-2 is granted a management CID2M 630-2. As illustrated in FIG. 6, the relay station 610 can, in one embodiment, create one connection 625 between itself and a base station 605. In this example, the relay station 610 conveys the MAC address of each subscriber station 615-$n$ to the base station 605 in every frame forwarded over the common CID 625. The relay station 610 and the base station 605 exchange management information using a management CID such as CID0M 635 of FIG. 6.

Figure 7:
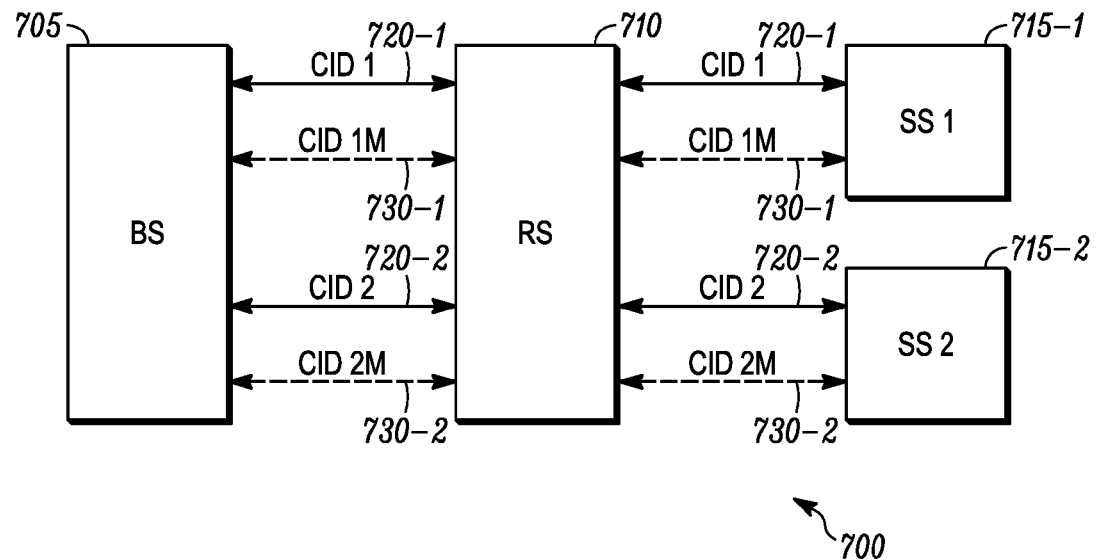

FIG. 7 illustrates an alternate exemplary communication scheme 700 for use within an IEEE 802.16 multihop relay communication network. As illustrated in FIG. 7, within the IEEE 802.16 multihop relay communication network, one or more subscriber stations 715-$n$ can access the network through a relay station 710. Each subscriber station 715-$n$ is granted at least one unique connection identification (CID) for its connection with the relay station 710. It will be appreciated by one of ordinary skill in the art that a subscriber station and a relay station can be granted more than one data CID, although one data CID is illustrated herein for exemplary purposes only. For example, subscriber station 1 715-1 is granted a CID1 720-1 and subscriber station 2 715-2 is granted a CID2 720-2. The relay station 710 learns each subscriber station's Media Access Control (MAC) address during the exchange for connection establishment and then associates the subscriber station's MAC address with the assigned CID. In practice, each subscriber station 1 715-$n$ is further granted a management CID 730-$n$ and a data CID 720-$n$. For example subscriber station 1 715-1 is granted a management CID1M 730-1 and subscriber station 2 715-2 is granted a management CID2M 730-2. As illustrated in FIG. 7, the relay station 710 establishes the same data connection CID1 720-1 and management connection CID1M 730-1 for relaying data and management information associated with the subscriber station 1 715-1; and establishes the same data connection CID2 720-2 and management connection CID2M 730-2 for relaying data and management information associated with the subscriber station 2 715-2.

Figure 8:
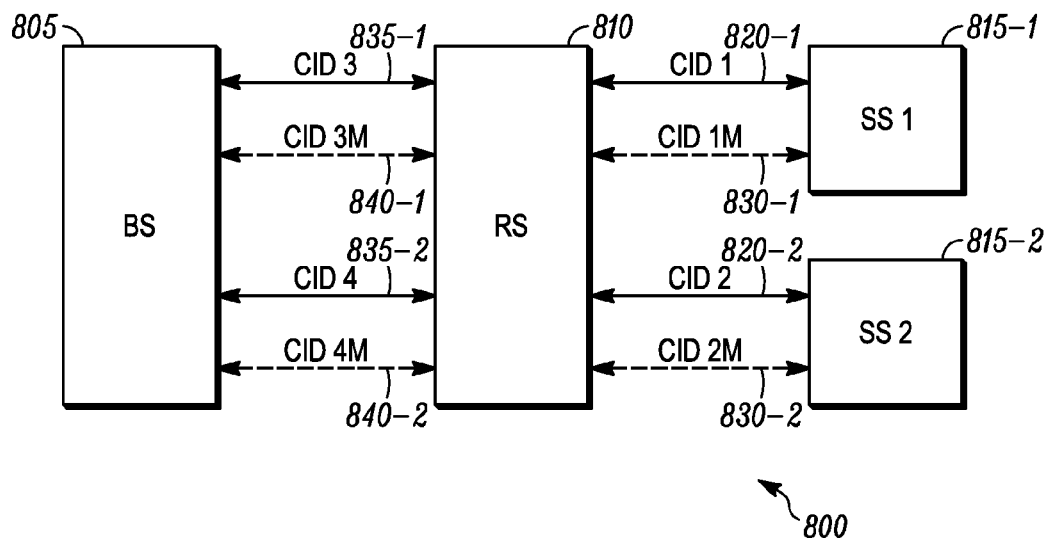

FIG. 8 illustrates an alternate exemplary communication scheme 800 for use within an IEEE 802.16 multihop relay communication network. As illustrated in FIG. 8, within the IEEE 802.16 multihop relay communication network, one or more subscriber stations 815-$n$ can access the network through a relay station 810. Each subscriber station 815-$n$ is granted at least one unique connection identification (CID) for its connection with the relay station 810. It will be appreciated by one of ordinary skill in the art that a subscriber station and a relay station can be granted more than one data CID, although one data CID is illustrated herein for exemplary purposes only. For example, subscriber station 1 815-1 is granted a CID1 820-1 and subscriber station 2 815-2 is granted a CID2 820-2. The relay station 810 learns the each subscriber station's Media Access Control (MAC) address during the exchange for connection establishment and then associates the subscriber station's MAC address with the assigned CID. In practice, each subscriber station 1 815-1 is further granted a management CID 830-$n$ and a data CID 820-$n$. For example subscriber station 1 815-1 is granted a management CID1M 830-1 and subscriber station 2 815-2 is granted a management CID2M 830-2. As illustrated in FIG. 8 the relay station 80 can, in one embodiment, create unique connections 835-$n$ between itself and a base station 805 associated with each subscriber station 815-$n$. For example, the relay station 810 can create a data connection CID3 835-1 for data communication with the base station 805 associated with the subscriber station1 815-1; and can create a data connection CID4 835-2 for data communication with the base station 805 associated with the subscriber station2 815-2. Similarly, the relay station 810 and the base station 805 can exchange management information associated with subscriber station 1 815-1 using a management connection CID3M 840-1; and can exchange management information associated with subscriber station 2 815-2 using CID4M 840-2. The relay station 810 uses the subscriber station's MAC address while forming the unique connections, so that the base station 805 also may associate the assigned CIDs with subscriber stations' MAC addresses. In practice, all connections may comprise of more than one CID, at least one of which is dedicated for management communications.

In accordance with the present invention, each relay station (i.e. relay station 400 of FIG. 4) maintains a mapping table (i.e. forwarding table 430 of FIG. 4) of CIDs to translate from an access segment CID (between SS-RS) and backhaul segment CID (between RS-BS or between RS-RS, in the case of multihop backhaul).

A packet being transmitted from the SS to the final destination will be forwarded on the CID between the SS and the RS. Note that this transmission does not carry the MAC addresses of the SS or the final destination. The RS receives the packet, notes the CID over which the packet was received, and maps it to the outgoing CID. The received packet is forwarded towards the BS on the CID between the RS and the BS. The packet exits the 802.16 network at the BS.

Figure 9:
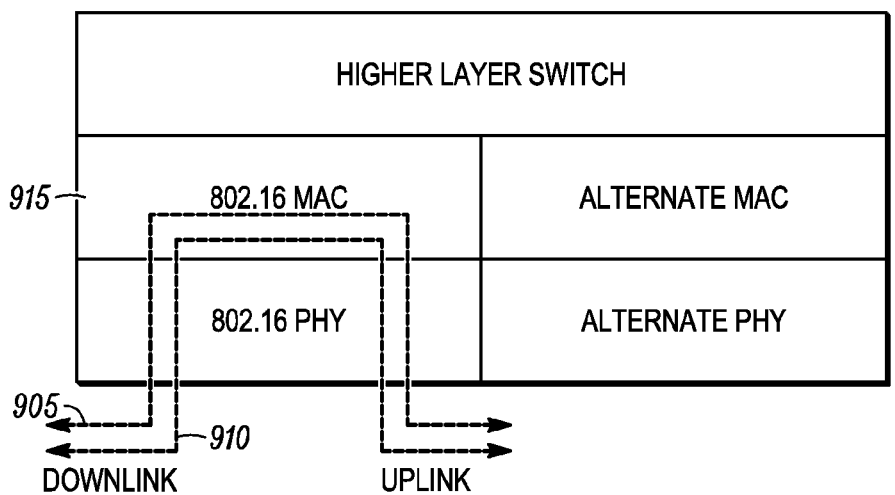
FIG. 9 illustrates an exemplary data flow within the relay station of FIG. 4 in accordance with some embodiments of the present invention.

As illustrated in FIG. 9, all the CID processing, including the translation from incoming CID to the outgoing CID is performed inside the L2 layer. For example, as shown in FIG. 9, all data flow 905 and all management CID information 910 are routed through the 802.16 MAC layer 915.

Figure 10:
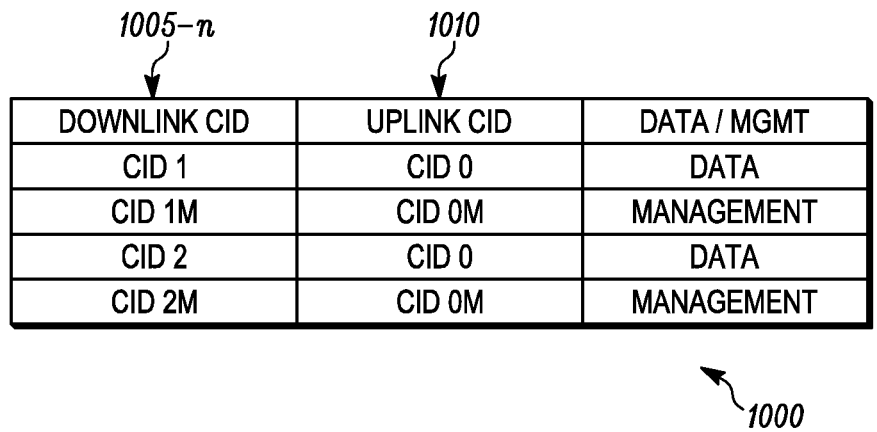
FIG. 10 illustrates a forwarding table stored within the relay station of FIG. 4 in accordance with some embodiments of the present invention.

FIG. 10 illustrates a forwarding table 1000 stored within the memory 425 of the relay station 400. Specifically, FIG. 10 illustrates the default behavior of the relay stations in the relay mode. As illustrated, the default behavior is to forward all connections from the incoming CIDs 1005-*n* to the outgoing CID 1010 similar to the communication paths illustrated in FIG. 6 previously. No traffic is exposed to the higher layers when in the relay mode.

Figure 11:
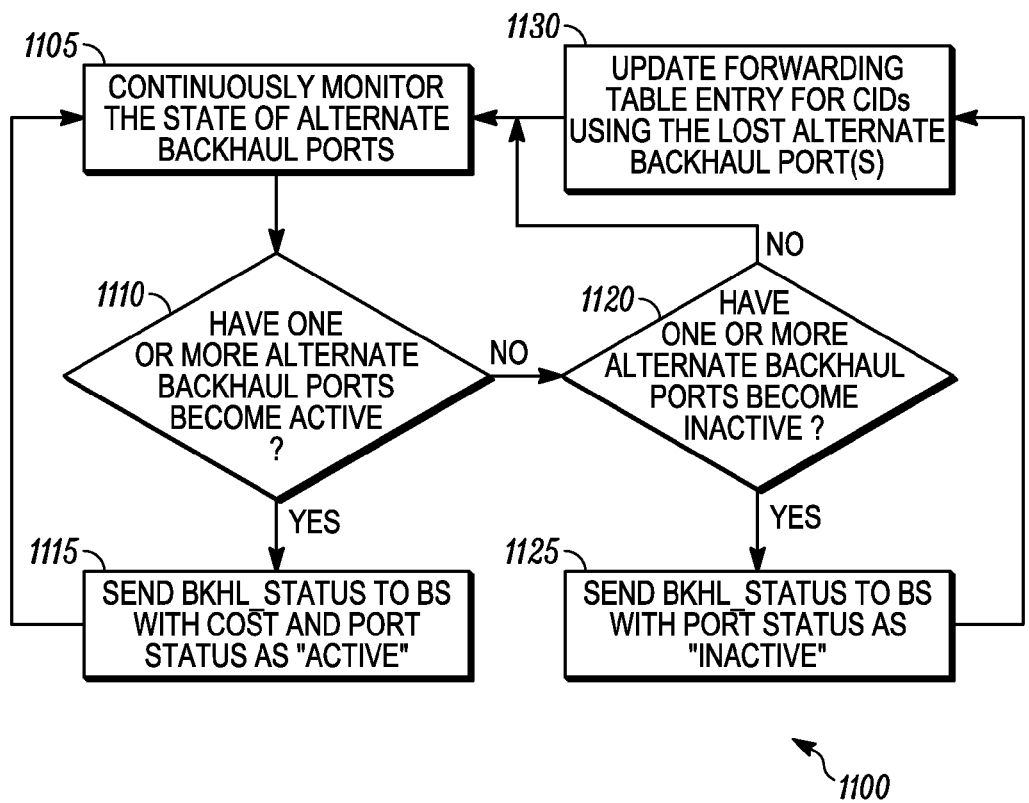
FIG. 11 is a flowchart illustrating an exemplary operation of the relay station of FIG. 4 in accordance with some embodiments of the present invention.

FIG. 11 illustrates an exemplary operation of the relay station 400 in accordance with some embodiments of the present invention. As illustrated in FIG. 11, the relay station 400 continuously monitors the state of alternate backhaul ports in Step 1105. Next, in Step 1110, the relay station 400 determines whether one or more alternate backhaul ports have become active. For example, the alternate backhaul detection mechanism 420 of FIG. 4 can detect whether or not one or more alternate backhaul ports have become active. When the relay station detects that an alternative backhaul port is available and active, its operation continues to Step 1115 in which it reports the cost of the backhaul option to the base station using a unicast management message, BKHL_STATUS (backhaul status), on its management CID to the base station.

The BKHL_STATUS message should comprise at least, an identifier for the alternate backhaul port (port_id), the numeric cost associated with using the backhaul port and a status flag indicating whether the status of the port is "active" or "inactive". When an alternative backhaul port is determined to become active, the RS should report it by setting the status flag as "active" in the BKHL_STATUS message.

When no alternate backhaul ports have become active in Step 1110, the relay station operation continues to Step 1120 in which it determines whether or one or more alternate backhaul ports have become inactive. When this is not the case, the operation cycles back to Step 1105.

When an alternate backhaul is no longer available at the relay station, the operation continues to Step 1125 in which the BKHL_STATUS is sent to the base station with the port status as "inactive. The relay station stops passing the payload to the higher layer switch and should start making bandwidth requests on the existing CIDs to the base station. Next, in Step 1130, the relay station updates its forwarding table entry for CIDs using the lost alternate backhaul ports. The operation then cycles back to Step 1105.

Figure 12:
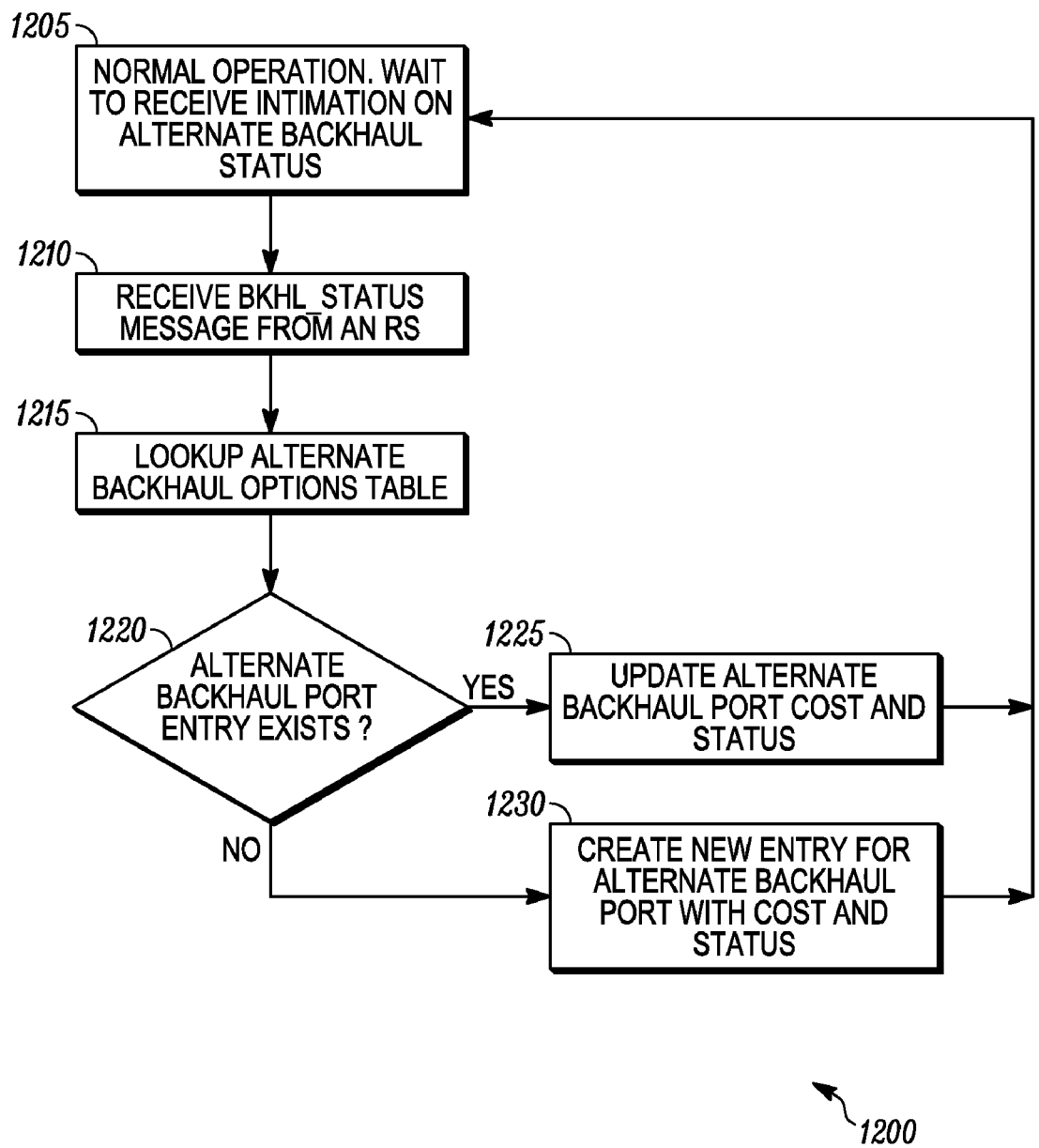
FIG. 12 is a flowchart illustrating an exemplary operation of the base station of FIG. 5 in accordance with some embodiments of the present invention.

FIG. 12 illustrates an exemplary operation 1200 of the base station 500 in accordance with some embodiments of the present invention. As illustrated in FIG. 12, In Step 1205, the base station 500 operates in normal operation awaiting receipt of information about an alternate backhaul status from one or more relay stations. Next, in Step 1210, the base station receives a BKHL_STATUS message from a relay station.

Figures 13, 14:
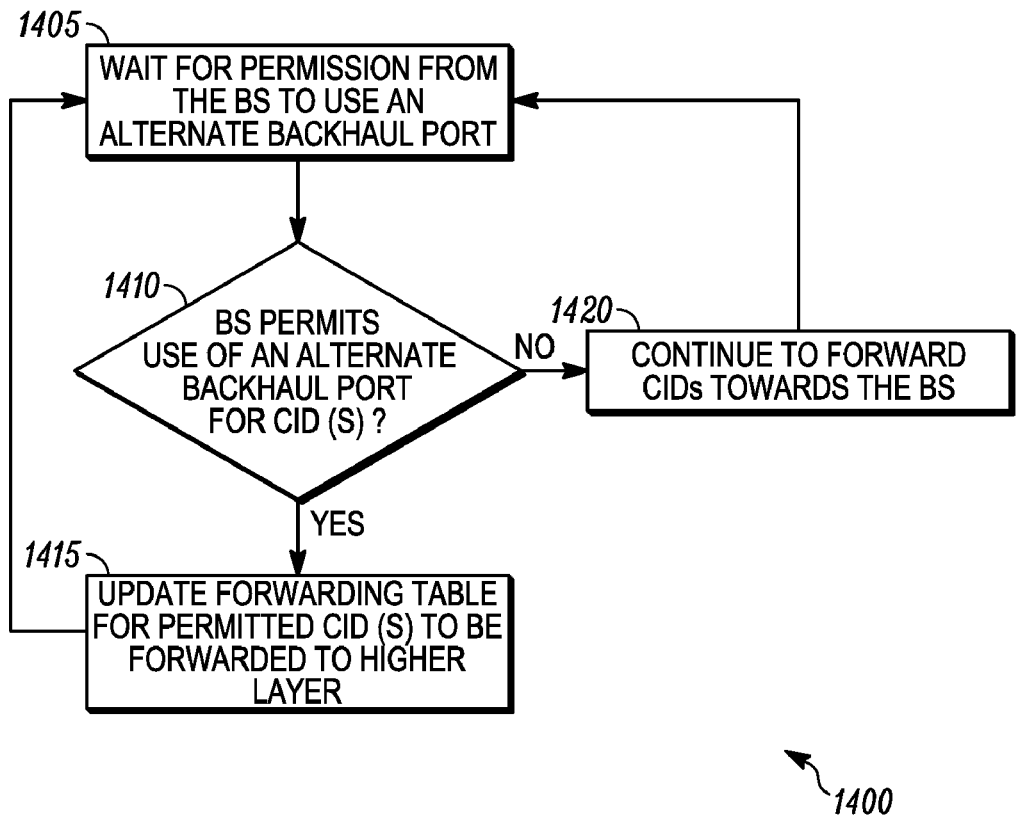
FIG. 13 illustrates an exemplary alternate backhaul options table stored within the base station of FIG. 5 in accordance with some embodiments of the present invention.
FIG. 14 is a flowchart illustrating an exemplary operation of the relay station of FIG. 4 in accordance with some embodiments of the present invention.

In accordance with the present invention, the base station 500 compiles a list of alternate backhaul options available to it, via its relay stations and their costs. This is done in the base station's Alternate Backhaul Options Table (ABOT) such as the ABOT 525 of FIG. 5. An exemplary ABOT as compiled by the base station is illustrated in FIG. 13. As illustrated in FIG. 13, for each alternate backhaul option available to the base station, the ABOT 525 stores the associated relay station ID 1305, port ID 1310, port cost 1315, and status 1320.

As illustrated in FIG. 12, upon receipt of a BKHL_STATUS message, the base station operation continues to Step 1215 in which the base station looks up the alternate backhaul options table. Next, in Step 1220, the base station determines whether the alternate backhaul port entry associated with the received BKHL_STATUS message exists in its ABOT. When the entry exists, in Step 1225, the base station updates the alternate backhaul port costs and status in the ABOT. When the entry does not exist, in Step 1230, the base station creates a new entry for the alternate backhaul port with cost and status. In both cases, the operation then cycles back to Step 1205.

FIG. 14 illustrates an exemplary operation of the relay station when intimated by the base station about the use of the alternate backhaul. Beginning at Step 1405, the relay station awaits permission form the base station to use an alternate backhaul port. Next, in Step 1410, the operation determines whether or not the base station permits the use of an alternate backhaul port for CIDs. For example, the base station may request a relay station to use the alternate backhaul instead of the IEEE 802.16 air-interface to the base station, for forwarding data connections. This request is also a unicast management message. This decision may be based on the load on the base station and may be a measure employed by the base station in order to alleviate the load via the relay stations. Management connections are still routed to the base station over the IEEE 802.16 air-interface. This request may switch the relay station from relay mode to the base station mode.

The base station may also consider the quality of service (QoS) requirements of the individual CIDs being served by the relay station and may chose to instruct the relay station to use the alternate backhaul to forward certain CIDs and to use the wireless link to the base station for other CIDs. Generally, there might be more contention on the air interface between the relay station and the base station. The base station may instruct the relay station to forward selected high-QoS CIDs over the alternate backhaul port so that they may avoid using the higher contention air interface. When the base station instructs the relay station to forward one of the CIDs of a subscriber station over that alternate backhaul, in some embodiments, the base station may instruct the relay station to forward all the data CIDs of that subscriber over that alternate backhaul.

When the base station permits use of an alternate backhaul in Step 1410, the operation of the relay station continues to Step 1415 in which the relay station updates its forwarding table for permitted CIDs to be forwarded to the higher layer. When the base station does not permit use of an alternate backhaul in Step 1410, the operation of the relay station continues to Step 1420 in which the relay station continues to forward the CIDs towards the base station. In either case, the operation then cycles back to Step 1405.

Figure 15:
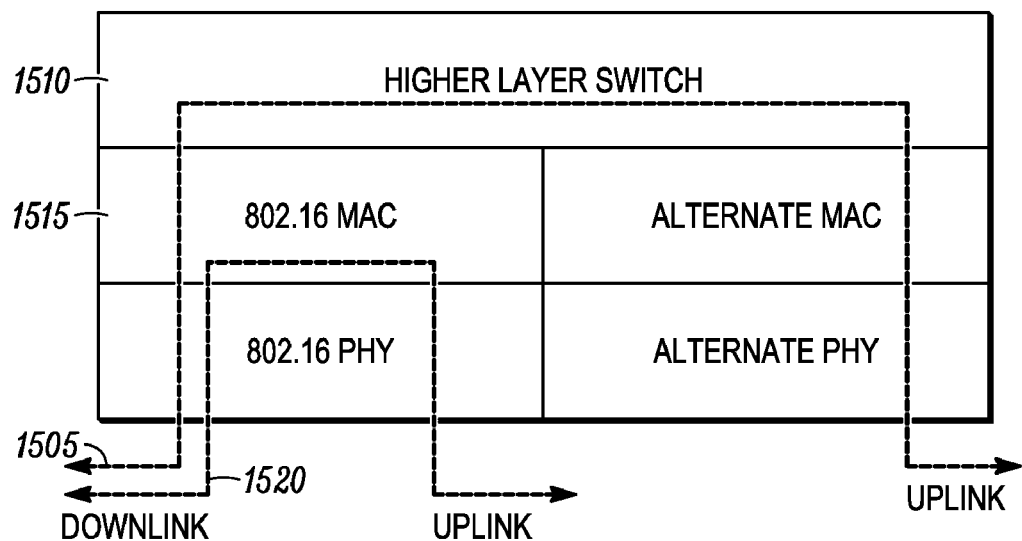
FIG. 15 illustrates an exemplary data flow within the relay station of FIG. 4 in accordance with some embodiments of the present invention.

FIG. 15 illustrates the processing 1500 of various data and management information by the relay station when in the base station mode. As illustrated, in the base station mode the relay station identifies data CIDs coming from the subscriber stations, determines if they are to be forwarded over an alternate backhaul, and strips the MAC header from the packets received from the subscriber stations. The payload 1505 is passed on to the higher layer switching function 1510 (this may be L2 or L3) for forwarding outside of the 802.16 network 1515. However, the relay station may continue to maintain all the CIDs between itself and the base station. All management traffic 1520 is still forwarded over the management CIDs between the relay station and the base station.

Figure 16:
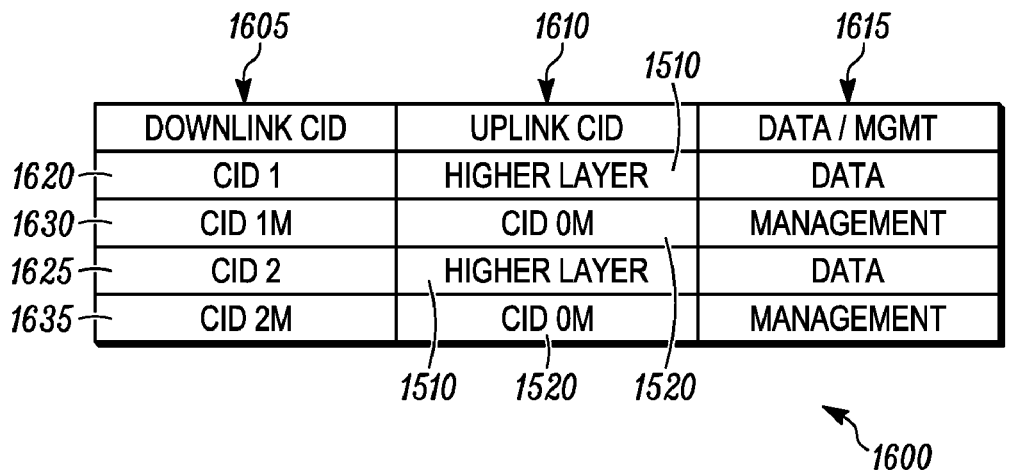
FIGS. 16 and 17 illustrate exemplary forwarding tables stored within the relay station of FIG. 4 in accordance with some embodiments of the present invention.

FIG. 16 illustrates an exemplary forwarding table 1600 stored within the relay station when the relay station is in base station mode. The forwarding table stores downlink CIDs 1605 and associated uplink CIDs 1610 along with the associated mode 1615. In this example, all data CIDs (1620, 1625) are shown to be forwarded to the Higher Layer 1510 so that they may use the alternate backhaul port. The management CIDs (1630, 1635) remain on the lower layer 1520.

Figure 17:
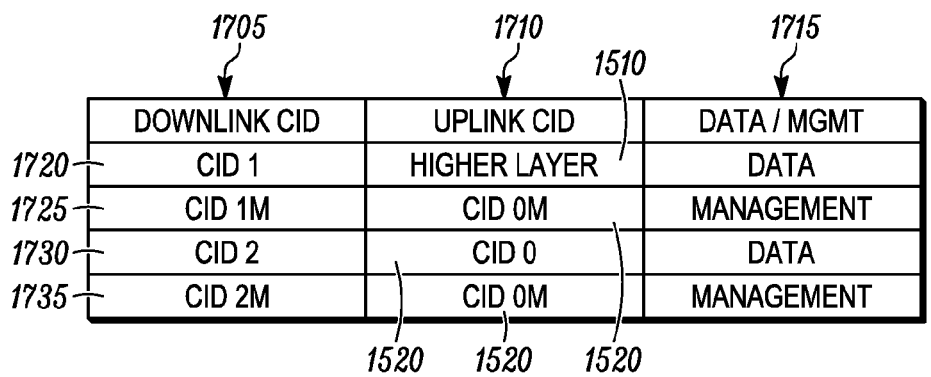

FIG. 17 illustrates an alternate exemplary forwarding table 1700 stored within the relay station when the relay station is in base station mode. The forwarding table stores downlink CIDs 1705 and associated uplink CIDs 1710 along with the associated mode 1715. In this example, the base station alternatively instructs the relay station to use the alternate backhaul port for selected CIDs alone. In that case the selected CIDs 1720 will be forwarded to the Higher Layer 1510 and the other CIDs (1725, 1730, 1735) will continue to be forwarded over the air interface 1520 towards the base station.

Figure 18:
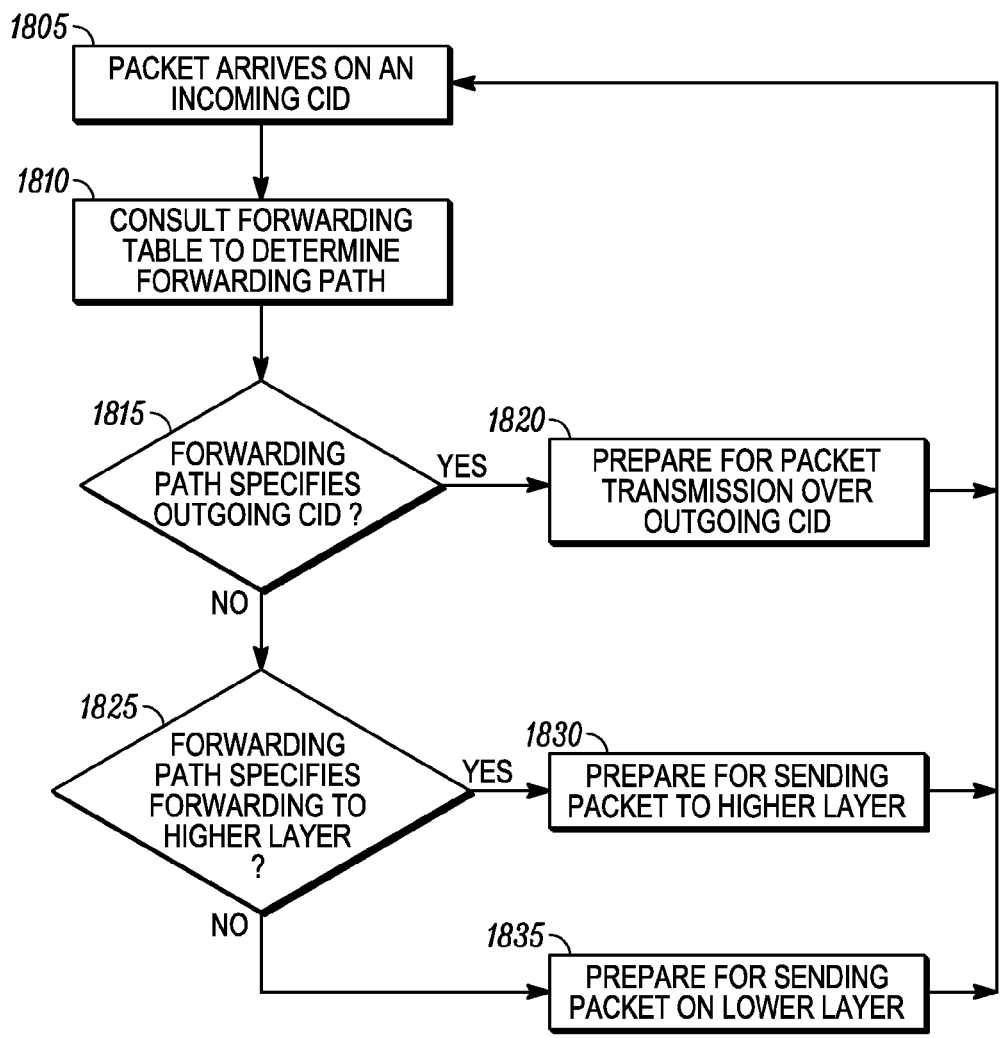
FIG. 18 is a flowchart illustrating the operation of the relay station of FIG. 4 in accordance with some embodiments of the present invention.

FIG. 18 is a flowchart illustrating the operation 1800 of the relay station in both the relay station mode and the base station mode. As illustrated, the operation begins at Step 1805 when a packet arrives at the relay station on an incoming CID. Next, in Step 1810, the relay station consults its forwarding table to determine the forwarding path. Next, in Step 1815, the relay station determines whether the forwarding path specifies an outgoing CID. When the forwarding path specifies an outgoing CID, the operation continues to Step 1820 in which the relay station prepares for packet transmission over the outgoing CID. The operation then cycles back to Step 1805. When the forwarding path does not specify an outgoing CID, the operation continues to Step 1825 in which the relay station determines whether the forwarding path specifies forwarding to a higher layer. When the forwarding path specifies forwarding to a higher layer, the operation continues to Step 1830 in which the relay station prepares the packet for sending to the higher layer. The operation then cycles back to Step 1805. When the forwarding path does not specify sending to the higher layer, the operation continues to Step 1835 and the relay station prepares the packet for sending on a lower layer. The operation then cycles back to Step 1805.

When the alternate backhaul is no longer available at the relay station, it should stop passing the payload to the higher layer switch and should start making bandwidth requests on the existing CIDs to the base station. The base station can detect the bandwidth requests on CIDs to relay stations, whom it had previously requested to use the alternate backhaul. The base station can update its local table to indicate that the relay station no longer has the alternate backhaul option. Alternatively, the relay station, upon detecting the loss of an alternate backhaul port can explicitly report the loss by setting the status flag as "active" in the BKHL_STATUS message and sending it to the base station on its management CID.

The base station may periodically transmit a "metric" denoting the cost of accessing the network through it, for use by relay stations and subscriber stations seeking to access the network and its services. This metric should be proportional to the cost of the backhaul available to the base station.

In the relay station mode a relay station periodically transmits a metric that is the sum of the base metric as advertised by its upstream node towards the base station, and the cost of reaching this upstream node. This upstream node may be another relay station or base station. The cost of reaching this upstream node should depend on the quality of the air interface link between itself and this upstream node.

In the base station mode, the relay station periodically transmits the metric that is proportional to the cost of the alternate backhaul port cost that it reported to the base station. If multiple alternate backhaul ports are active simultaneously, the metric is proportional to the lowest cost. It does not use the additive metric based on the cost of the backhaul at the base station.

In this manner, subscriber stations and other relay stations will have the option of accessing the network through the relay station directly, if the cost associated with the alternate backhaul at the relay station is lower.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A communication network comprising:
   at least one base station communicatively coupled to a backhaul for routing one or more messages each having an associated connection identification (CID) within a first set of CIDs through the backhaul to at least one destination;
   at least one relay station communicatively coupled to the at least one base station and further communicatively coupled to at least one alternate backhaul, the at least one relay station including:
   a relay station mode of operation for relaying the one or more messages between the at least one base station and at least one subscriber station, and
   a base station mode of operation for routing one or more messages each having an associated connection identification (CID) within a second set of CIDs from the at least one subscriber station through the at least one alternate backhaul to the at least one destination; and
   the at least one subscriber station communicatively coupled to the at least one base station and further communicatively coupled to the at least one relay station.

2. The communication network as claimed in claim 1 comprising an 802.16 network.

3. A method of operation of a communication network comprising:
   communicating at least one message having a connection identification (CID) within a first set of CIDs from a subscriber station to a destination by communicating the at least one message from the subscriber station via a relay station to a base station coupled to a backhaul for forwarding of the at least one message from the base station to the destination; and communicating at least one other message having a connection identification (CID) within a second set of CIDs from the subscriber station to the destination by communicating the at least one other message from the subscriber station to the relay station for forwarding of the at least one other message over an alternate backhaul to the destination.

4. The method of operation of the communication network as claimed in claim 3 wherein the communication network comprises an 802.16 network.

5. The method of operation of the communication network as claimed in claim 3 further comprising:
  communicating one or more management information between the relay station and the base station.

6. The method of operation of the communication network as claimed in claim 3 wherein the communication via the alternate backhaul step comprises within the relay station:
  receiving a communication packet including a CID from a subscriber station,
  determining that the communication is to be forwarded over the alternate backhaul,
  stripping a MAC header from the communication packet, and
  passing the communication packet without the MAC header to a higher layer switching function for communication via the alternate backhaul.

7. The method of operation of the communication network as claimed in claim 6 further comprising prior to the passing step:
  adding a new header to the communication packet.

8. The method of operation of the communication network as claimed in claim 3 wherein the communicating the at least one message via the relay station step comprises within the relay station:
  translating an incoming communication to an outgoing communication inside an L2 layer.

9. The method of operation of the communication network as claimed in claim 8, wherein the communication network comprises an 802.16 network, and further wherein the L2 layer comprises an 802.16 MAC layer.

10. A relay station for use within a communication network, the relay station comprising:
  a first port for relaying one or more messages each having an associated connection identification (CID) within a first set of CIDs between a subscriber station and at least one destination through a base station coupled to a backhaul when the relay station is in a relay station mode of operating; and
  a second port for routing one or more messages each having an associated connection identification (CID) within a second set of CIDs from the at least one subscriber station through an alternate backhaul to the at least one destination when the relay station is in a base station mode of operation.

11. The relay station as claimed in claim 10 wherein the communication network comprises an 802.16 network, and further wherein the first port comprises an 802.16 port.

12. A method of operation of a relay station within a communication network comprising:
  operating the relay station in a relay station mode, wherein in the relay station mode, the relay station relays one or more received communications between a base station operating on a primary backhaul and a first subscriber station; and
  operating the relay station in a base station mode, wherein in the base station mode, the relay station routes one or more received communications from a second subscriber station to an alternate backhaul.

13. The method of operation of the relay station within the communication network as claimed in claim 12 wherein the communication network comprises an 802.16 network.

14. The method of operation of the relay station within the communication network as claimed in claim 12 further comprising:
  communicating one or more management information between the relay station and the base station.

15. The method of operation of the relay station within the communication network as claimed in claim 12 wherein the operating the relay station in the base station mode step comprises:
  receiving a communication packet including a CID from the second subscriber station,
  determining that the communication is to be forwarded over the alternate backhaul,
  stripping a MAC header from the communication packet, and
  passing the communication packet without the MAC header to a higher layer switching function for communication via the alternate backhaul.

16. The method of operation of the relay station within the communication network as claimed in claim 12 wherein the operating the relay station in the relay station mode step comprises:
  translating an incoming communication to an outgoing communication inside an L2 layer.

17. The method of operation of the relay station within the communication network as claimed in claim 16, wherein the communication network comprises an 802.16 network, and further wherein the L2 layer comprises an 802.16 MAC layer.

18. A method of operation of a communication network comprising a base station operating on a primary backhaul, one or more relay stations, and one or more subscriber stations, the method comprising:
  coupling an alternate backhaul to a relay station, wherein the alternate backhaul includes a cost metric; and
  communicating a message having a first message type from a subscriber station to a destination device via the relay station over the alternate backhaul when the cost meets a predetermined criteria; and
  communicating a message having a second message type from the subscriber station to the destination device by the relay station forwarding the message to the base station and the base station communicating the message to the destination over the primary backhaul.

19. The method of operation of the communication network as claimed in claim 18, further comprising prior to the communication step:
  reporting the cost metric from the relay station to the base station; and
  determining an acceptance of the use of the alternate backhaul by the base station using the cost metric.

20. The method of operation of the communication network as claimed in claim 19, further comprising prior to the determining step:
  maintaining a table in the base station including one or more alternate backhauls available in the one or more relay stations and each associated cost metric.

21. The method of operation of communication network as claimed in claim 20, wherein the message includes a quality of service requirement, and wherein the determining step comprises:

determining an acceptance of the use of the alternate backhaul for the message by the base station using the cost metric and the quality of service requirement.

22. The method of operation of the communication network as claimed in claim 20 further comprising:

determining by the subscriber station one of the base station or a relay station to associate with using the cost metric.

23. The method of operation of the communication network as claimed in claim 22, further comprising prior to the determining step:

periodically transmitting by the base station a metric proportional to the cost of the backhaul for use by the subscriber station in the determining step.

24. The method of operation of the communication network as claimed in claim 23, further comprising prior to the determining step:

periodically transmitting by the relay station an additive metric including the metric proportional to the cost of the backhaul for use by the subscriber station in the determining step.

25. The method of operation of the communication network as claimed in claim 22, further comprising prior to the determining step:

periodically transmitting by the relay station a cost proportional to a cost of a cheapest alternate backhaul coupled to the relay station.

* * * * *